INVENTORS
Toshio Sawamura
BY Tokeo Hayashi

Townsend and Townsend
attorneys

United States Patent Office 3,022,961
Patented Feb. 27, 1962

3,022,961
PICKUP MEANS FOR A SPINNING REEL
Toshio Sawamura and Takeo Hayashi, Tokyo, Japan, assignors to Jorgensen Bros., Pleasanton, Calif.
Filed Dec. 17, 1959, Ser. No. 860,220
3 Claims. (Cl. 242—84.21)

The present invention defines improvements in pickup means for fishing reels of the closed face or spin type, such as described in our copending application entitled "Fishing Reel," Serial No. 706,832, filed January 2, 1958, and now abandoned.

Fishing reels of the spin or closed face type as described in my copending application include a non-rotatable or substantially non-rotatable line spool and an associated rotatable spooling member. A pickup member, which may be a pin radially mounted on the spooling member, is normally retained radially inwardly of the spooling member by spring means, whereby line may pay off the spool about the spooling member for casting. Rotation of the spooling member through operatively connected means engages the inner end of the pin with a cam which in turn projects the pin outward of the spooling member, whereby the pin engages and retrieves line, depositing it on the spool.

It has been found that, whereas the foregoing generally described reel is satisfactory with small game, the use of heavy duty line for relatively large game results in sufficient tension on the projecting pin to bind the latter, preventing retraction of the pin when it is desired to pay out line.

Another objectionable feature of the above described reel resides in the fact that the inner end of the pin rides upon the cam when the line is being retrieved, causing excessive wearing of the pin and cam. In this connection, it will be appreciated that the use of a stronger spring to overcome tension on the spring when used for heavy duty purposes would aggravate wearing of the pin and cam.

In accordance with the present invention, the pickup means of the spooling member comprises a tooth pivoted eccentrically of the spooling member. The tooth may be pivoted in the same direction in which the spooling member is rotatable to a first position with the tooth projecting radially from the spooling member, and the tooth is pivotally movable in a reverse direction to a second position with the tooth disposed within the periphery of the spooling member, whereby line may pay out about the spool. Movement of the tooth is effected by a dog pivoted on the spooling member. The dog is normally spring biased into engagement with a detent on the tooth to retract the latter, and an edge of the dog is selectively engageable with a cam to pivot the dog against the tooth, forcing the latter to the first position projecting radially outwardly from the spooling member.

One object of the present invention resides in the fact that the radially projecting tooth is retractable by movement of the tooth in a direction of rotation of the spooling member, whereby the tooth is retracted in the same direction as the force exerted on it by the tension on the line, and the line not only does not bind the tooth, preventing its retraction but, to the contrary, the tension on the line pulling upon the tooth assists its retracion.

Another object resides in the pivotal mounting of the dog means for actuating the pickup member, whereby the force of the spring tending to move the dog toward the cam when the dog is riding thereon is concentrated at the pivotal point, substantially diminishing the tension on the cam and accordingly the wear on the cam and the dog when line is being retrieved.

Other objects and advantages of the invention will become apparent upon reading the following specification and referring to the accompanying drawings in which similar characters of reference represent corresponding parts in each of the several views.

Figure 4:

FIG. 4 fragmentarily illustrates an operable cam.

The illustrated reel includes a frame 12 which mounts a non-rotatable line spool 14. A spooling member 16 secured on a drive shaft 18 as by a nut 20 is axially movable through button 22 relatively toward and away from spool 14. Compression spring 23 biases member 16 rearwardly toward the spool. Crank 24 through gears 26 is operative to rotate drive shaft 18 and consequently spooling member 16 in a clockwise direction as viewed in FIGS. 2 and 3.

A sleeve 28 which mounts spool 14 terminates at its front in a cam 30.

Figure 2:
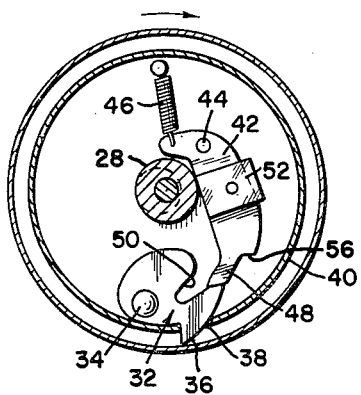
FIG. 2 is a view taken substantially on line 2—2 of FIG. 1.
Figure 3:
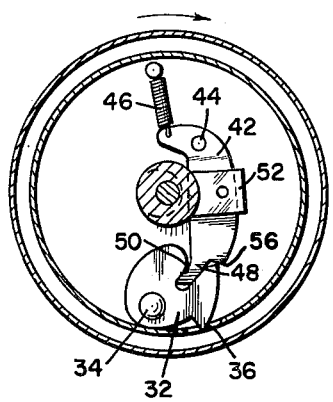
FIG. 3 is a view similar to FIG. 2 but showing the pickup member retracted.

The pickup member 32 appearing in FIGS. 2 and 3 is pivoted as at 34 to spooling member 16 and is formed with a tooth 36 pivotally movable in the same direction as that in which spooling member 16 is rotatable to a first position with the tooth projecting substantially radially through an aperture 38 in flange 40 which defines the periphery of spooling member 16. Pivotal movement in a reverse direction retracts tooth 36 to a position at least flush with the periphery of spooling member 16.

The means for projecting and retracting the pickup member 32 include a dog 42 which also is pivoted eccentrically on spooling member 16 as at 44. A tension spring 46 normally engages a toe 48 of the dog with a detent 50 in pickup member 32, retracting the latter to the above noted second position at least flush with the periphery of the spooling member. A lamina of plastic material or plastic carrier 52 coating dog 42 substantially at its middle prevents excessive wear of the dog at this point when riding on sleeve 28 as will appear.

The illustrated reel includes a means for reciprocating spool 14 for uniform deposit of retrieved line on the spool. A gear 51 engages teeth (not illustrated) on the reverse surface of master gear 26. A rod 53 is connected at its forward end 55 to spool 14, and the other end is formed with a vertical slot 57 which is engaged by an eccentric 59 on gear 51. Rotatable movement imparted to gear 51 is transmitted to reciprocal movement of spool 14 by rod 53 in a well-known manner.

Figure 1:
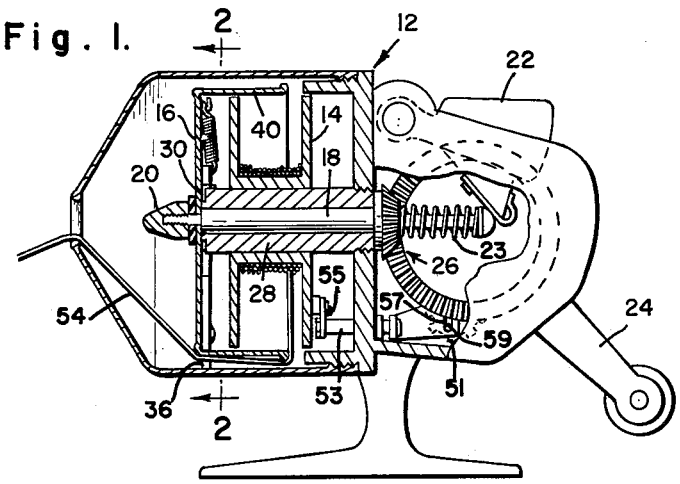
FIG. 1 is a side elevation, partly in cross section, of a spin type fishing reel employing a preferred embodiment of the present invention.

In use, depression of button 22 moves drive shaft 18 and spooling member 16 forwardly from the position of FIGS. 1 and 2, disengaging dog 42 from sleeve 28, whereby toe 48 under tension of spring 46 engages detent 50 retracting tooth 36 such that line indicated at 54 will pay out from spool 14 for purposes of casting. It will be observed a stop or notch 56 on the dog engages member 32 preventing the dog from pivoting further inwardly than the lowermost point on cam 30.

Upon rotating crank 24, spooling member 16 is caused to rotate in a clockwise position as viewed in FIGS. 2 and 3, and the centrally located plastic lamina 52 on dog 42 is engaged by cam 30, forcing the dog outwardly against the tension of spring 46, and in cooperation with the retracting tension of spring 23, the dog is also moved rearwardly until lamina 52 rides on sleeve 28. At the same time, toe 48 of the dog biases tooth 36 outwardly to the position illustrated in FIGS. 1 and 2 with the tooth 36 projecting substantially radially outwardly from spooling member 16. Upon continued rotation, projecting tooth 36 engages line 54 to retrieve the latter. Since the tension of spring 46 moving dog 42 relatively against sleeve 28 is focused at pivotal point 44, wear between the dog and sleeve, when the former is rotated relative to the latter is substantially diminished over conventional radially mounted pickup pins. The spring and cam in effect form a vector of forces concentrated at pivot 44.

Since tooth 36 is retracted through a pivotal arc reverse to the direction in which spooling member 16 is rotatable, the tooth is retracted in the same direction as the force exerted on it by the tension of the line, and the latter, rather than binding tooth 36 as in the case of a conventional radially mounted pin, in fact assists retraction of the pin.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a fishing reel including a frame, a line spool and a spooling member coaxially mounted on said frame with one of said spool or said spooling member being rotatable relative to the other, and means for rotating the rotatable one of said spool and spooling member in a first direction, the combination of a tooth pivotally supported on said rotatable member adjacent the periphery thereof, said tooth normally residing in a retracted position inwardly of the periphery of the spooling member but rotatable to move to a projecting position with the tooth projecting beyond the periphery of said spooling member, and a dog pivotally supported on said rotatable member radially inwardly of said tooth operable to control the movement of said tooth between said retracted and projecting positions.

2. In a fishing reel including a frame, a line spool supported on the frame, a spooling member rotatably mounted coaxially adjacent said spool, and means for rotating said spooling member, the combination of pickup means having a tooth and detent pivotally supported on said spooling member immediately adjacent the periphery thereof, said pick-up means being movable in a plane transverse to the axis of said spooling member and in the same rotational direction as said spooling member to project the tooth substantially beyond the periphery of said spooling member and in a reverse direction to withdraw said tooth to a point inwardly of the periphery of said spooling member, a dog pivotally connected to said spooling member at a point radially inward from the projecting and retracted positions of said pick-up means to engage surfaces defining said detent to move said tooth between said retracted and projecting positions, means cooperating with said dog to normally bias the tooth to its retracted position, and means associated with the frame of said reel to selectively control the movement of said dog to thereby control the movement of said tooth.

3. A fishing reel in accordance with claim 2 wherein said dog has a plastic carrier and said control means include a cam associated with said frame and having a camming surface engageable by said plastic carrier to move the dog outwardly from the retracted position as the spooling member is rotated and including means to move the spooling member in translation thereby to disengage said carrier from said camming surface so that the biasing means are operative to return said dog and tooth to the retracted position and wherein the location of the pivot point for said dog relative to said cam and spring means is selected to reduce the component of the biasing force that acts on said cam.

References Cited in the file of this patent

UNITED STATES PATENTS

| 2,724,563 | Shakespeare et al. | Nov. 22, 1955 |
| 2,862,679 | Denison et al. | Dec. 2, 1958 |
| 2,919,077 | Underwood et al. | Dec. 29, 1959 |

FOREIGN PATENTS

| 1,124,422 | France | July 2, 1954 |
| 1,172,393 | France | Oct. 13, 1958 |
| 820,874 | Great Britain | Sept. 30, 1959 |